US 7,055,067 B2

(12) United States Patent
DiJoseph

(10) Patent No.: US 7,055,067 B2
(45) Date of Patent: May 30, 2006

(54) SYSTEM FOR CREATING, STORING, AND USING CUSTOMIZABLE SOFTWARE TEST PROCEDURES

(75) Inventor: Philip DiJoseph, Malvern, PA (US)

(73) Assignee: Siemens Medical Solutions Health Services Corporation, Malvern, PA (US)

( * ) Notice: Subject to any disclaimer, the term of this patent is extended or adjusted under 35 U.S.C. 154(b) by 667 days.

(21) Appl. No.: 10/254,131

(22) Filed: Sep. 25, 2002

(65) Prior Publication Data

US 2003/0159089 A1    Aug. 21, 2003

Related U.S. Application Data

(60) Provisional application No. 60/358,993, filed on Feb. 21, 2002.

(51) Int. Cl.
    *G06F 11/00* (2006.01)
(52) U.S. Cl. ............................ 714/38; 714/33; 717/126
(58) Field of Classification Search ................. 714/46; 717/126
    See application file for complete search history.

(56) References Cited

U.S. PATENT DOCUMENTS

| | | | | |
|---|---|---|---|---|
| 4,696,003 A | | 9/1987 | Kerr et al. ................. 371/19 |
| 5,218,605 A | | 6/1993 | Low et al. ................. 371/16.1 |
| 5,490,249 A | * | 2/1996 | Miller ....................... 714/38 |
| 5,754,840 A | | 5/1998 | Rivette et al. ............. 395/602 |
| 5,913,023 A | * | 6/1999 | Szermer .................... 714/38 |
| 5,983,001 A | | 11/1999 | Boughner et al. ...... 395/183.14 |
| 6,038,378 A | | 3/2000 | Kita et al. ............. 395/183.14 |
| 6,049,811 A | | 4/2000 | Petruzzi et al. ............. 707/507 |
| 6,081,533 A | * | 6/2000 | Laubach et al. ............. 370/421 |
| 6,182,245 B1 | * | 1/2001 | Akin et al. .................. 714/38 |
| 6,195,765 B1 | | 2/2001 | Kislanko et al. ............. 714/38 |
| 6,298,327 B1 | | 10/2001 | Hunter et al. ................. 705/1 |
| 6,415,396 B1 | * | 7/2002 | Singh et al. ................. 714/38 |
| 6,442,714 B1 | * | 8/2002 | Griffin et al. ................ 714/46 |
| 6,581,020 B1 | * | 6/2003 | Buote et al. ................ 702/123 |
| 6,671,874 B1 | * | 12/2003 | Passova ..................... 717/126 |
| 6,725,399 B1 | * | 4/2004 | Bowman .................... 714/38 |
| 6,862,696 B1 | * | 3/2005 | Voas et al. .................. 714/38 |

OTHER PUBLICATIONS

Microsoft Press Computer Dictionary Third Edition, "ANSI", Microsoft Press, 1997, p. 25.*
Microsoft Press Computer Dictionary Third Edition, "document", Microsoft Press, 1997, p. 156.*

(Continued)

*Primary Examiner*—Scott Baderman
*Assistant Examiner*—Gabriel Chu
(74) *Attorney, Agent, or Firm*—Alexander J. Burke

(57) ABSTRACT

A system and method for software test is disclosed that allows user management and adaptation of test procedures and the resulting test data. In an embodiment, the system and method provide a cross-platform user interface which allows testing to be conducted on a plurality of platforms, i.e. it is not integrated with a single platform or language (e.g., C++, Visual Basic, Java, or the like). The method further allows a user to customize a predetermined set of system characteristics relating to the stored test procedure. It is emphasized that this abstract is provided to comply with the rules requiring an abstract which will allow a searcher or other reader to quickly ascertain the subject matter of the technical disclosure. It is submitted with the understanding that it will not be used to interpret or limit the scope of meaning of the claims.

17 Claims, 9 Drawing Sheets

OTHER PUBLICATIONS

Paulk, A Comparison of ISO 9001 and the Capability Maturity Model for Software, Jul. 1994, Software Engineering Institute.*

Chun-Chia Wang, et al.; *an Automated Object-Oriented Testing for C == Inheritance Hierarchy*.

Jonathan Gray; *Software Engineering Tools*.

Bogdan Korel; *Automated Software Test Data Generation*.

Uwe Nonnenmann et al.; *Software Testing with Kitss*.

Zhang Xinjun, et al.; *An Approach to Automated Program Testing and Debugging*.

Web—*Based Bug Tracking Tool*; www.qalinks.com/Tools/Automated Testing.

AQ TEST—Automated Application Testing: www.automatedqa.com/products/aqtest.asp.

CodeTest Vision for Embedded software; www.amc.com/products/codetest.

McCabe AQ; www.mccabe.com/mccabe qa.php.

AutoTester ONE®; www.autotester.com/content/soft at1.htm.

* cited by examiner

SYSTEM FOR CREATING, STORING, AND USING CUSTOMIZABLE SOFTWARE TEST PROCEDURES

RELATION TO OTHER APPLICATIONS

The present invention claims priority through U.S. Provisional Application 60/358,993 filed on Feb. 21, 2002 for "A Software Test Creation, Validation, And Management System."

FIELD OF THE INVENTION

The present invention relates to automated software application testing.

BACKGROUND OF THE INVENTION

Automated testing comprises automating a previously manual testing process. Typically, automated testing tools require that a formalized manual testing process currently exists, e.g. a set of detailed test cases and test scripts, including a set of results expected for a given test case and test environment which provides an initial, known test bed that allows the test cases to be repeated from a known starting place. Test cases are most often derived from a set of system requirements to be verified as being satisfied by the system under test.

Commercially developed software testing tools have design constraints, e.g. they are specifically designed to be Internet web testers, performance testers, regression testers, script generators, test data generators, and the like. These tools have limited customization capabilities. Moreover, these tools are often static with respect to tailorability to a given test bed.

However, application systems and environments differ, e.g. in platform, application requirements, and user tastes and desires. Testing methodologies and procedures also vary greatly and often require adaptability to meet the user's quality needs and certification goals.

A need exists for a standardizable format and/or process that allows integration of software application testing tools and the software application testing process with other applications such as office applications, e.g. word processors, spreadsheets, and the like. Test results need to be stored in a manner that supports integration with office tools such as word processors. Such integration would further allow sharing and using test systems and their data by a group of people. Sharing is often needed when a group collaborates in a testing effort.

There is also a need for flexible reporting, e.g. user tailorable, ad hoc result reports.

System test tools also need to be able to gather and/or generate test metrics and make these metrics available for post testing analysis, e.g. metrics comprising comparisons of test data results between two iterations of project versions, integration into the test system of defects found later by users or technical support, reliability calculations, and the like.

Accordingly, a test system which provides for testing to a desired test level and thoroughness but which is adaptable to the system under test is desirable. As opposed to current test systems which most often require the system under test to be architected or otherwise modified to work with a test tool, a test tool should itself be able to be modified and adapted to work with the system under test. Such adaptation should provide for management and customization of the test system, including management and customization of test procedures, resulting test data, and presentation of the resulting test data. Ideally, the user interface that allows access to the test system's functions should be customizable as well to adapt to the system under test.

SUMMARY

A system and method for software test are described which allow a user to manage and customize a test system comprising test procedures and resulting test data. Customization of the system facilitates a user's ability to add and/or modify fields, tables, and reports to the system as well as change the look and operation of the user interface and its menus.

In an embodiment of a method, a first test procedure is stored for later use in user assisted testing of a set of functions of an executable application. A test system user may be allowed to customize a predetermined set of system characteristics relating to the stored test procedure. Test data may be acquired and task steps to be performed by the first test procedure may be identified. An executable second test procedure, corresponding to the first test procedure, may be created to automatically exercise a set of functions selected for the executable application. Result data may also be acquired.

Given its adaptability, the present invention is adaptable to a business' testing needs and development standards.

The scope of protection is not limited by the summary of an exemplary embodiment set out above, but is only limited by the claims

BRIEF DESCRIPTION OF THE DRAWINGS

The features, aspects, and advantages of the present invention will become more fully apparent from the following description, appended claims, and accompanying drawings in which:

FIG. 5 is an exemplary user interface form to tailor system information;

FIG. 6 is an exemplary user interface form to define actions to be undertaken;

DETAILED DESCRIPTION OF THE PREFERRED EMBODIMENT

In general, throughout this description, if an item is described as implemented in software, it can equally well be implemented as hardware. It is also understood that "data," as used herein, is either singular or plural as the context requires. As further used herein, "certification" comprises processes used to verify and validate that a desired feature or function of a system under test is present and performs according to a predetermined set of performance criteria, e.g. produces a correct result in the presence of data.

As used herein, the following terms have the following meanings, as will be understood by those of ordinary skill in the software application testing arts. A "test case" is a set of test inputs, execution conditions, and expected results developed to validate or otherwise verify obtaining a given set of results for a predetermined set of input data and conditions. A "test procedure" is a set of detailed instructions for setting up, executing, and evaluating results obtained from executing one or more test cases. A "test script" is a human or computer readable set of directives and instructions that describe execution of all or a portion of a test procedure. An "automated test script" is a test script that is executable by a computer with little or no manual input required. A "test requirement" is a condition or capability needed by a user, system, or portion of a system to solve a problem or achieve an objective. Test requirements may include a condition or capability to be met or possessed by a system or system component to satisfy a contract, standard, specification, or other formally imposed documents.

Figure 1:
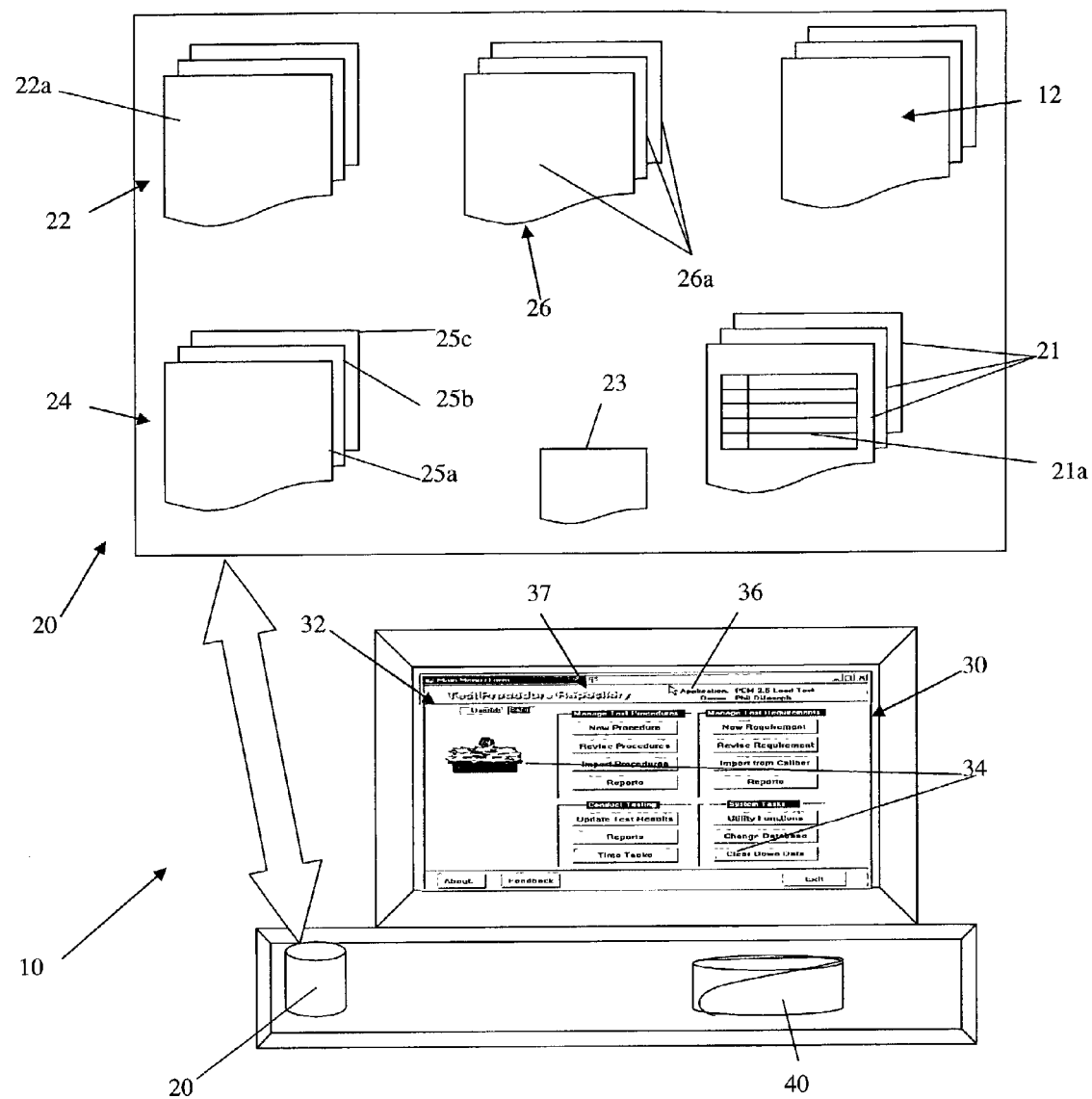
FIG. 1 is schematic overview of an exemplary system.

Referring now to FIG. 1, in an exemplary embodiment, system 10 for creating and maintaining test procedures 25b comprises user customizable certification database 20 and user interface 30. System 10 is adapted to allow a user to customize a predetermined set of system characteristics 12 relating to certification database 20. Executable application 40 is the software and/or system to be tested.

Certification database 20 further comprises requirement repository 22 which contains requirements 22a to be tested for executable application 40; test procedure repository 24, which, in a preferred embodiment, may be linked to requirements repository 22; and test results repository 26. Database 20 may be used to import and export data from other software systems such as a third party's computer aided software engineering tool or performance testing tool.

A user may customize system 10 by manipulating fields 21a, tables 21, reports 23, and even the look and feel of user interface 30 and its menus 36, thus adapting system 10 to a business' or application system's requirements. As used herein, software application requirement repository 22, test procedure repository 24, and test results repository 26 may be tables 21 within database 20. Accordingly, software application requirement repository 22, test procedure repository 24, and test results repository 26 may be manipulated as tables, e.g. by modifications of one or more field 21a in a record in software application requirement repository 22, test procedure repository 24, and test results repository 26.

Manipulatable system characteristics 12 may include user customizable characteristics relating to stored test procedures 25b. For example, a user may manipulate field 21a in table 21 such as by changing its type or other characteristics, manipulate table 21 as a component of customizable database 20 such as by adding new fields 21a to existing fields 21a in table 21, manipulate report 23 such as by adding detail or formatting, manipulate user interface 30 such as by altering the appearance of user interface 30, and the like, or a combination thereof. As used herein, manipulate comprises adding, deleting, modifying, or the like, or combinations thereof.

Figure 1A:
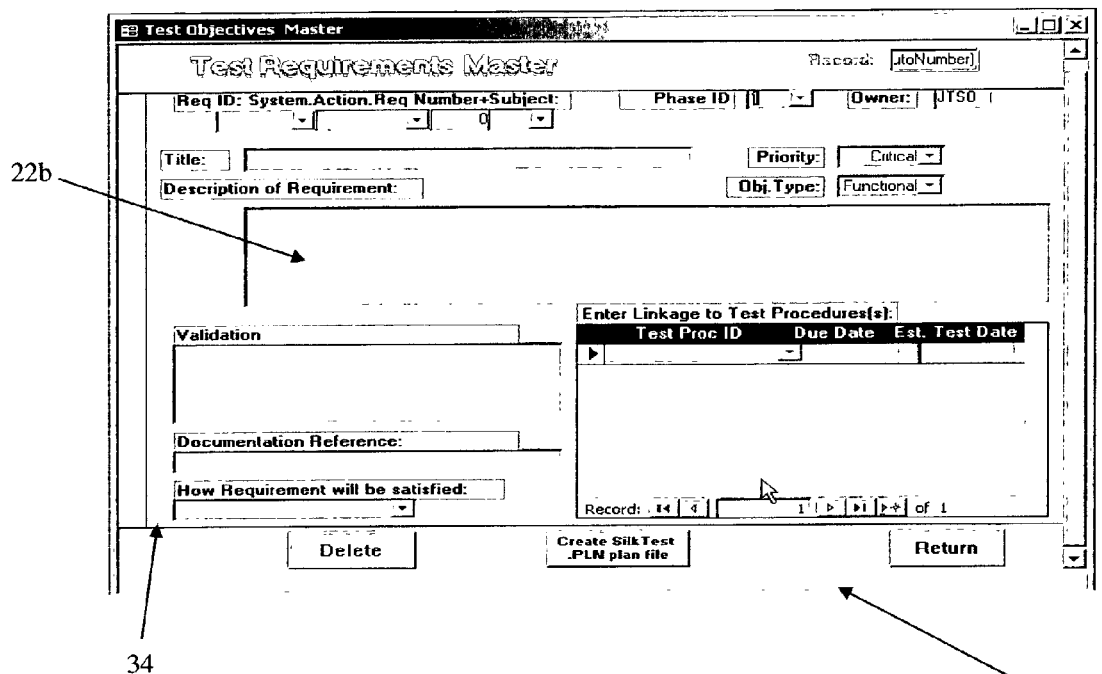
FIG. 1a is an exemplary system requirements user interface.

Referring now to FIG. 1a, as illustrated in an exemplary user interface to test requirement repository 22 (FIG. 1), test requirement repository 22 (FIG. 1) contains brief statements 22b that may be accessed and used to describe what is to be accomplished in a predetermined phase of testing such as unit testing, integration testing or system testing as well as supporting data for that phase.

Referring back to FIG. 1, test requirements 22a may be stored in tables 21 in database 20. For example, a test requirement 22a might be to verify that the software or system may be installed, to ensure that executable application 40 is operational after it has been installed, or to determine that concurrent users may access and update data without causing conflicts or corrupting data. Supporting data may include, but is not limited to, dates on which testing is to occur, priority of each requirement, owner, instructions as to how to accomplish testing, and the like, or combinations thereof.

Test procedure repository 24 comprises elements 25, where elements 25 may comprise pointers to test requirements 25a, test procedures 25b, test references 25c, or the like, or a combination thereof. Test procedures 25b are typically step-by-step instructions which may be manual, automated, or partially manual and partially automated. Test procedures 25b define or otherwise describe how to perform a specific test, e.g. test procedures 25b may comprise one or more steps that describe a specific action to take as well as define the expected result that should occur after the action is taken. Test references 25c comprise information that may be used to associate test procedures 25b with one or more system objects such as screen names, executable programs, and databases. These references may be used to create a traceability report to show the relationship of various system components to test procedures 25b. For example, if a programmer changes a screen displayable form called "Main Menu," a report may be used to show which test procedures 25b reference that form. Those test procedures 25b may be rerun (or modified) to regression test the changes to the "Main Menu" form.

Figure 1B:
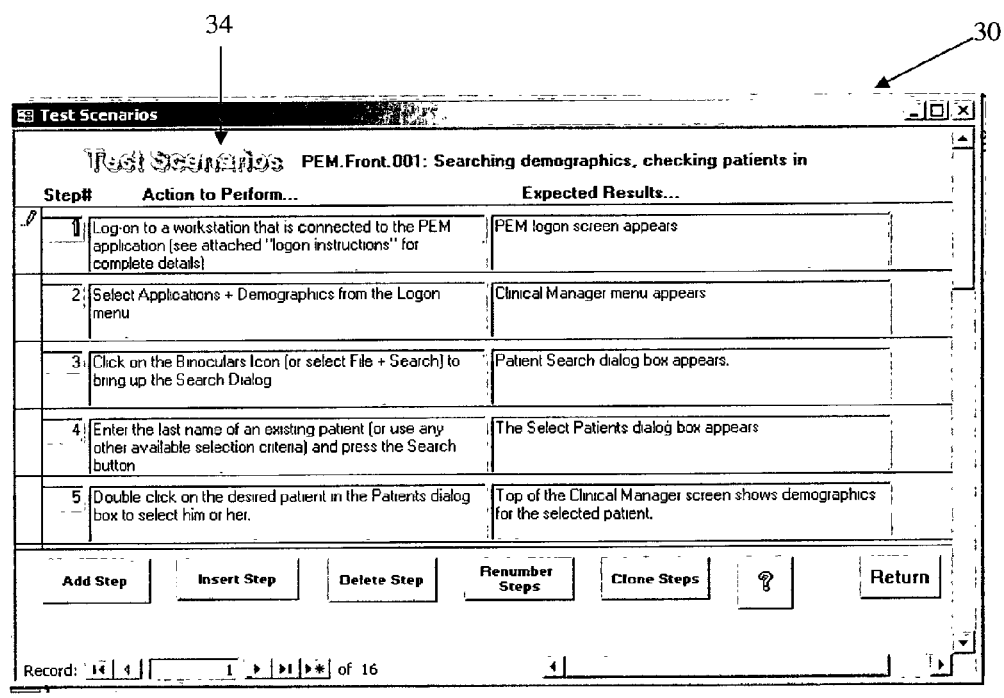
FIG. 1b is an exemplary test scenario user interface form.

In a preferred embodiment, test results repository 26 may be present to contain retrievable test results 26a, and each element 25 in test procedure repository 24 may be linked to at least one requirement 22a in software application requirements repository 22. A form 34, an example of which is shown in FIG. 1b, may be used to define and/or otherwise maintain test scenarios, e.g. actions undertaken in test procedure 25b and a test result expected in response to that action.

User interface 30 is adaptable to allow the user to customize a predetermined set of system characteristics 12 relating to system 10 and its certification database 20. For example, user interface 30 may comprise user customizable appearance characteristics of graphical interface 32, e.g. colors, content 34 of graphical interface 32, appearance characteristics of menu 36, and content 37 of menu 36.

User interface 30 may comprise menus 36, sub-menus, and various controls that are used to value each of the data elements of the system and to initiate execution of processing options such as report generation. Any of the objects of user interface 30 may be modified to accommodate the capture of different data and/or the exercising of new processing features. This allows system 10 to be adapted to a predetermined look and feel and operation required to integrate smoothly with internal testing procedures and standards of the enterprise.

In a currently preferred embodiment, system 10 employs the ACCESS™ database management system manufactured by Microsoft® Corp. of Redmond, Wash. In this currently preferred embodiment, system 10 may be integrated into a general office system, e.g. it may import items from and export items into general office applications such as word processors. "Items," as used herein, include descriptions of application and function test requirements, test results 26a, and the like.

However, other equivalent database management systems may be used, e.g. those which support the Open Database Connectivity (ODBC) and/or an application programming interface (API) for database access such as to SQL Server™ marketed by Microsoft Corp.

In the operation of an exemplary embodiment, in general, in a preferred embodiment, prior to using system 10, a user may elect to review internal testing policies, test requirements 22a, test procedures 25b, and test metrics to be captured to substantiate the testing efforts. As used herein, a "test metric" is a data or statistic that measures some event. For example, test metrics may comprise a measure of hours spent testing, defects encountered by root cause (program error, documentation error, user confusion, etc.), defects encountered by module or application under test, defects encountered by test procedure, defects encountered by their severity (critical, major, minor, etc.), percent of test procedure steps that passed versus failed, pass/fail counts by test procedure or test procedure step at the requirement level (e.g. 98% of test procedure steps for procedures linked to requirement "x" passed), defects encountered by hours or days of testing, defects encountered by tester, and the like, or combinations thereof. Test metrics may also be combined with other metrics gathered outside of a testing effort to arrive at additional metrics such as defects by lines of code (KLOC) or changed lines of code, defects by programming organization/group, defects for this version of the product versus the prior version, defects for this testing effort compared to other testing efforts, or the like, or combinations thereof.

After review, a user may elect to modify desired elements of system 10 to comply with the desired testing policies and test procedures 25b, e.g. a data element, user interface 30, report 23, and the like. Further modifications may be made as well such as to import/export desired elements using one or more additional supported tools, e.g. requirements repository and automated testing tools.

If necessary, a user may further assess external testing standardization requirements needed for testing, e.g. the International Standards Organization's ISO 9000, and make such other modifications to elements of system 10 to ensure that test results 26a will satisfy those external testing standardization requirements.

For a particular testing engagement, a user, having modified system 10 as described above, initializes database tables 21a as needed, e.g. creates new tables 21a, reuse tables 21a from prior tests, and the like. Test requirements 22a are input and/or imported, as are test procedures 25b, which may be linked to test requirements 22a using data entry form 30 (FIG. 1a). A predetermined number of linked test procedures 25b may be linked to application specific data elements to be tested, e.g. screens, modules, and the like such as by using the form shown in FIG. 8.

Once initialized and linked, execution of test procedures 25b may be initiated to conduct manual testing. Test results 26a and timing data may be captured, e.g. input and/or imported into one or more test result tables 21a. If required, one or more reports 23 may be created to substantiate the testing efforts.

Figure 10:
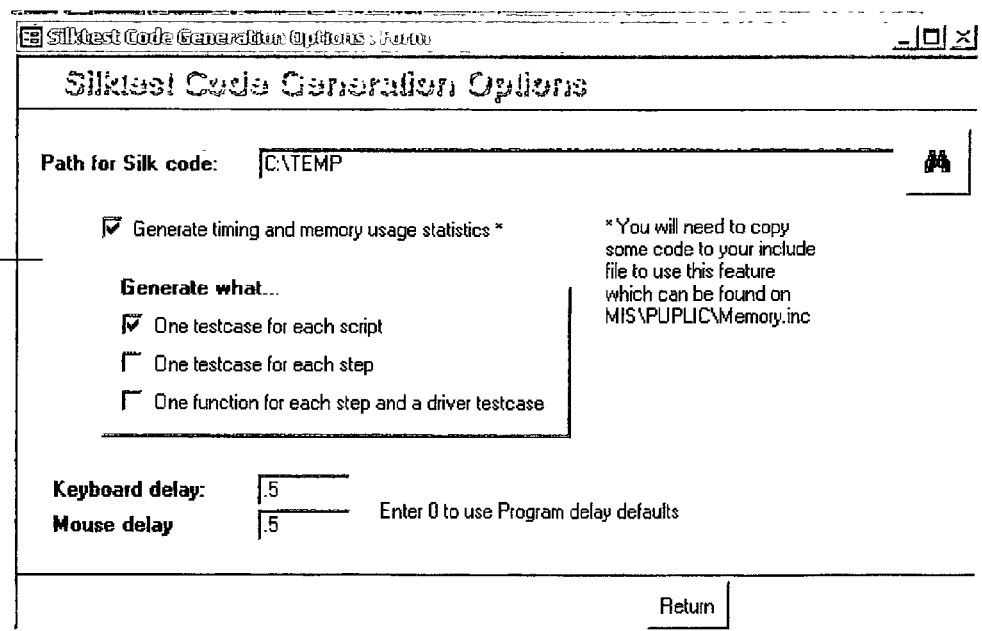
FIG. 10 is an exemplary user interface form useful to generate a test script shell.

If further desired, automated test script shells may be created from the validated and tested manual test procedures 25b, where "shell," as will be familiar to those of ordinary skill in the software arts, is a rudimentary prototype of a test script which may be completed at a later time. An exemplary interface used to control the generation of automated test scripts is shown in FIG. 10, including specifying and/or otherwise manipulating test script generation options. Automated scripts may be used at a later time, e.g. for stress, regression, or performance related tests.

Metrics from manual and automated testing may be used by a quality control system, e.g. data from system 10 may be exported into other systems and analyzed as needed.

Figure 2:
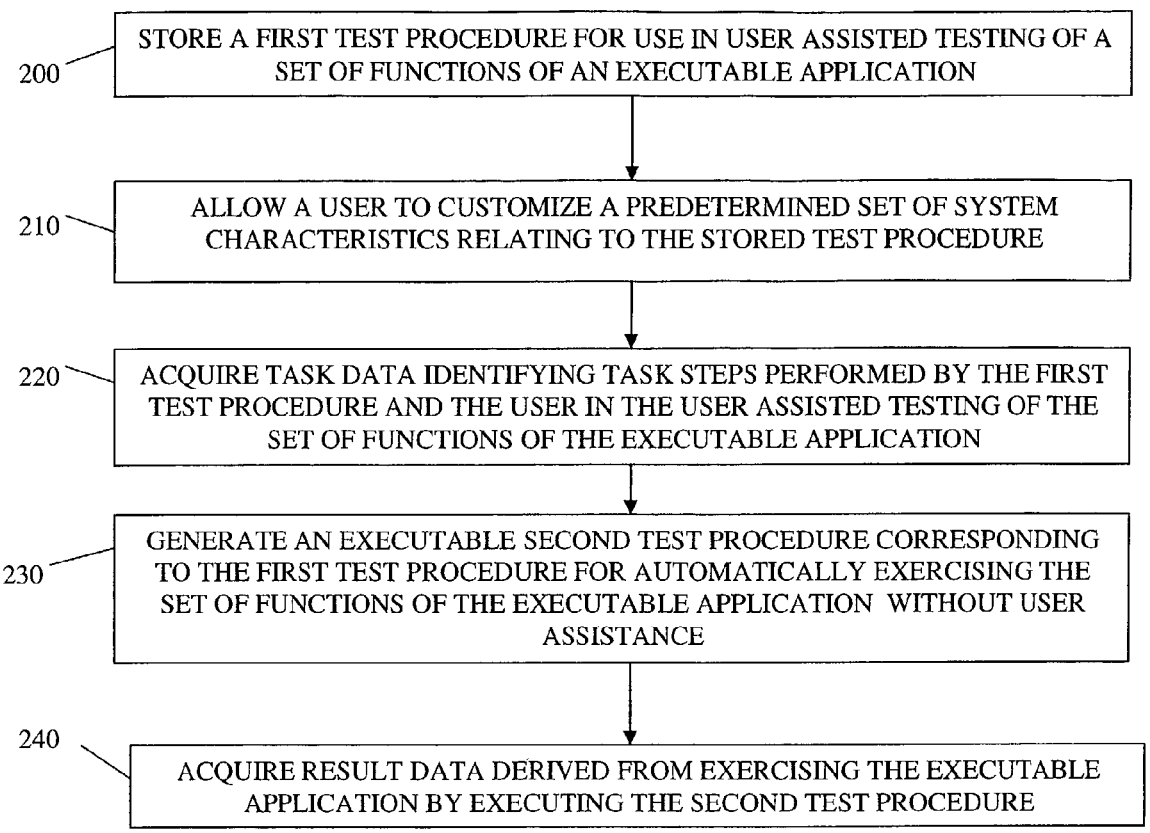
FIG. 2 is a flowchart of an exemplary method of the present invention.

Referring now to FIG. 2 is a flowchart of an exemplary software test method for managing user adaptable test procedures and resulting test data according to system 10. A user stores, step 200, first test procedure 25b (FIG. 1) for use in user assisted and/or automated testing of a set of components of executable application 40 (FIG. 1). Individual components of executable application 40 (FIG. 1) may comprise an executable procedure used by executable application 40, a function implemented by executable application 40, a user interface form used by executable application 40, a software object employed by executable application 40, or the like, or a combination thereof. As used herein, "executable application 40" is understood to include software, hardware, and systems comprising hardware and software.

Prior to storing first test procedure 25b (FIG. 1), an entry in database 20 (FIG. 1) may be created for a pre-existing requirement 22a (FIG. 1) for executable application 40 (FIG. 1) describing or otherwise defining what to test. Test procedure 25b (FIG. 1) may be created for test requirement 22a (FIG. 1) which describes or otherwise defines how to test the corresponding test requirement 22a.

Additionally, first test procedure 25b (FIG. 1) may be associated with documentary and other data describing test requirement 22a (FIG. 1) of executable application 40 (FIG. 1). Functions of executable application 40 to be exercised may also be associated with, e.g. linked to, one or more corresponding individual test procedures 25b of test procedure repository 24 (FIG. 1), e.g. in database 20 (FIG. 1).

The user may elect to customize, step 210, one or more predetermined system characteristics 12 (FIG. 1) relating to test procedure 25b (FIG. 1), e.g. test procedure 25b stored in database 20 (FIG. 1). Using system characteristics 12 (FIG. 1), system 10 may be modified and adapted to meet requirements 22a (FIG. 1) of executable application 40 under test (FIG. 1), e.g. operating system and/or target language platform requirements, as well as a business' requirements, e.g. level of testing, level of reporting detail, and the like.

Task data identifying task steps performed by first test procedure 25b (FIG. 1) and the user in user assisted testing of executable application 40 (FIG. 1) are acquired, step 220, such as by observing and collating user initiated keyboard key strokes and by reviewing detailed functional specifications. Task data may include instructions for acquiring test related timing data, memory usage related data, command sequence data, and the like, or combinations thereof. Data may be entered via user interface 30 (FIG. 1) and stored in various tables 21 (FIG. 1) of database 20 (FIG. 1).

Execution of first test procedure 25b (FIG. 1) may be initiated. Result data 26a (FIG. 1) which may result from executing first test procedure 25b may also be acquired. Results 26a (FIG. 1), e.g. test outcome related information based on the acquired test data, may be recorded such as in database 20 by exercising the appropriate controls on user interface 30.

In an alternative embodiment, an executable second test procedure 25b (FIG. 1) may be generated, step 230, corresponding to first test procedure 25b, for automatically exercising the set of functions of the executable application 40 without user assistance. System 10 may generate an automated test procedure template or shell that may be annotated, e.g. with comments. The automated test procedure template may be supplied and augmented with directives and/or data at a later time with keystrokes and commands from a host automated testing tool to create fully automated scripts which may be executed in an unattended manner.

As used herein, a host automated testing tool may comprise a host automation language, e.g. a proprietary scripting language used by an automated testing tool such as SILK-TEST™ from Segue Software, Inc. of Lexington, Mass. or WinRunner® from Mercury Interactive Corporation of Sunnyvale, Calif. Such automated testing tools comprise systems that automate manual test procedures by providing script programming languages, record and playback capabilities, test data repositories and/or other features that can be used to mimic user interactions and system behavior to drive applications in an unattended manner without human interaction. Such systems are typically used for tasks such as regression, stress, and performance testing.

Result data 26a (FIG. 1) derived from exercising executable application 40 (FIG. 1) by executing second test procedure 25b may be acquired, e.g. as shown in step 240.

Figure 3:
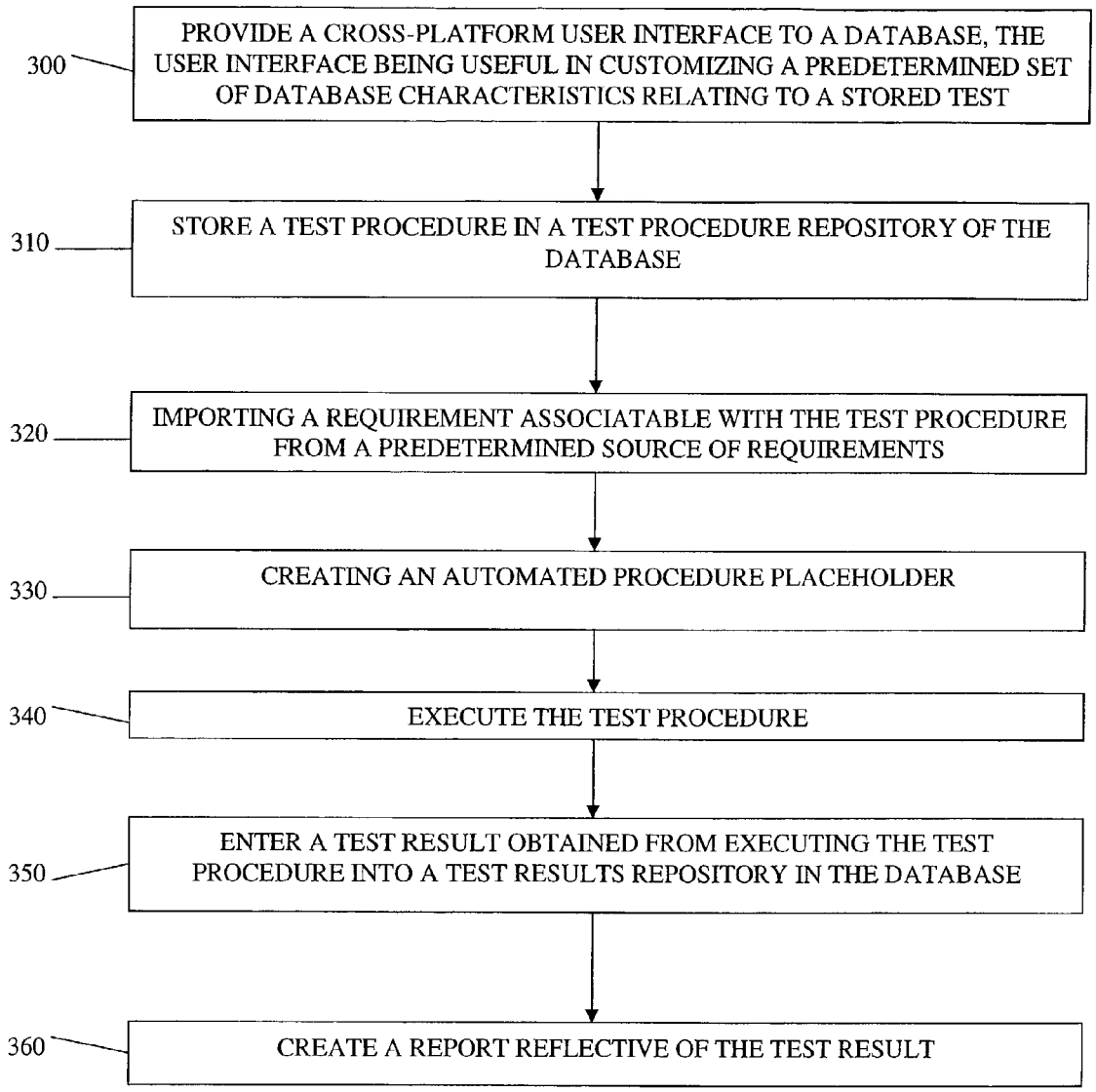
FIG. 3 is a flowchart of an exemplary method of creation of an executable test application created for managing a user adaptable test procedure.

Referring now to FIG. 3, an executable test application may be created for managing user adaptable test procedures 25b (FIG. 1) and reporting on user adaptable resulting test data 25c (FIG. 1). At step 300, a cross-platform capable user interface 30 (FIG. 1) to database 20 (FIG. 1) may be provided. User interface 30 may be used when customizing a predetermined set of characteristics 12 (FIG. 1) of database 20 relating to test procedure 25b, e.g. stored in database 20, and report 23 (FIG. 1) of test results 26a (FIG. 1). Such a cross-platform user interface 30 may include testing abilities which may be conducted on a plurality of platforms, e.g. it is not integrated with a single platform, such as UNIX or Microsoft® Windows®, or language such as C++, Visual Basic, Java, or the like.

Test procedure 25b (FIG. 1) may be stored, step 310, in test procedure repository 24 (FIG. 1) of database 20 (FIG. 1). Stored manual test procedures 25b may be used as a basis for generation of test primers, e.g. written or displayable guidelines and/or test scripts, as well as for detailed elements of such test primers.

One or more requirements 22a (FIG. 1) associatable with test procedure 25b (FIG. 1) may be imported, step 320, from a predetermined source of requirements 22a, e.g. an application design document or functional requirements document.

One or more automated procedure stubs, which are placeholders for finalized test procedures, may be created, step 330, and test procedure 25b (FIG. 1) executed, step 340. The placeholders comprise syntactically correct comment statements that are output for each step of a test procedure 25b. A host automated testing tool, e.g. SILKTEST™ or WIN-RUNNER®, may be executed and commented instructions provided to the user who may follow the commented instructions to record and capture application interactions that are detailed in the underlying test procedure 25b.

For example, system 10 (FIG. 1) may create an automated test script derived from a manual test script. The automated script may contain program code to capture timing data and to control desired features of system 10, e.g. record/playback features. As used herein, the generated script is an automated procedure placeholder or stub in that it contains comment lines corresponding to one or more steps of the manual procedure from which the generated script was derived. A user may use an automated testing tool such as SILK-TEST™ by opening the automated procedure placeholder and record actual keystrokes and mouse interactions necessary to drive the application under test in the manner specified by each manual test procedure step. This process augments the automated procedure placeholder by creating a fully functioning automated test script that may be used in unattended playback to perform regression, performance, load and other forms of testing.

Test result 25c (FIG. 1) obtained from executing test procedure 25b (FIG. 1) may be stored, step 350, into test results repository 26 (FIG. 1) in database 20 (FIG. 1). Test success and/or failure results at the test procedure and/or test procedure step level may be collated and stored. Associated test step timing information, along with other key metrics such as defect ticket numbers, may also be stored.

If the user so elects, report 23 (FIG. 1) may be created, step 360, that reflects test result 25c (FIG. 1). As part of test procedure execution, data related to a time of executing test procedure 25b (FIG. 1) may be entered and optionally reflected in test report 23 (FIG. 1), e.g. data related to the time of execution and length of test execution. As used herein, report 23 may comprise a collection of reports 23 that are derived from test procedures 25b and test requirements 22a as well as test results repository 26 (FIG. 1). Information in report 23 may be suitable to support certification by a standards associated organization, e.g. International Standards Organization (ISO), Capability Maturity Model (CMM), the United States of America Food and Drug Administration (FDA), and American National Standards Institute (ANSI). Additionally, users may be provided with options that allow user customization of information in report 23, e.g. custom reports based on the recorded test outcome related information which may include customer indicators as to whether individual requirements of test requirements 25a (FIG. 1) were met.

Because system 10 (FIG. 1) is customizable, tables 21 (FIG. 1) in database 20 (FIG. 1) may be used to link test requirements 25a (FIG. 1) with test procedures 25b (FIG. 1) and their results 26a (FIG. 1). Test metrics may also be generated, e.g. descriptions of test coverage or test result regression progress.

Additionally, customization of system 10 (FIG. 1) may include allowing a user to add new test procedures 25b (FIG. 1) and new database components that support different types of testing, e.g. unit test, integration test, system test, beta test, and the like, or combinations thereof. Customization of system 10 (FIG. 1) may further include allowing a user to define and implement additional metrics as needed. Additionally, steps in test procedure 25b (FIG. 1) and requirements 25a (FIG. 1) may be exported to other, more specialized tools such as specialized automated test tools or office applications.

Further, as system 10 (FIG. 1) is customizable, system 10 may be used to gather disparate testing functionality into a single package with a unified user interface 30 (FIG. 1), e.g. defect tracking, test case drivers, and the like.

Figure 4:
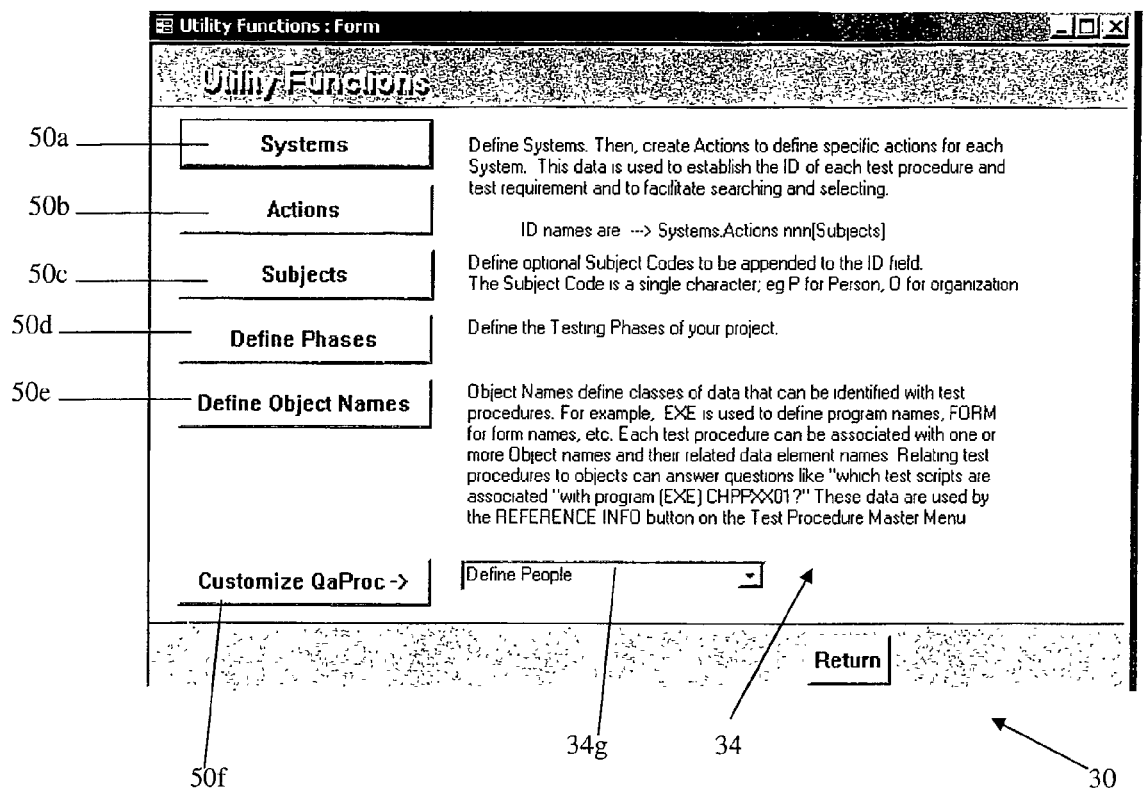
FIG. 4 is an exemplary user interface form showing a primary user access form.

By way of example and not limitation, referring now to FIG. 4, in a preferred embodiment system 10 (FIG. 1) comprises an application written in Microsoft® Access® and is customizable, e.g. a user with appropriate rights may change characteristics of system 10 such as by changing a selected Microsoft object such as a screen, report, table, query, module, or the like. Using a front end such as is provided by a database system such as Microsoft® ACCESS®, a user may customize system 10 by changing various programmatic settings such that key data values and options are not "hard coded," minimizing the need to make external programming changes by using properties exposed by the database system.

By way of further example, a user changeable feature of user interface 30 (FIG. 1) may include a user selectable portion, e.g. content 37 (FIG. 1), of a displayable menu 36 (FIG. 1) where selection of that user selectable portion retrieves a utility functions menu 36 or form 34, an exemplar of which is illustrated in FIG. 4. Buttons 50a, 50b, 50c, 50d, 50e, and 50f may be present at form 34 to invoke predetermined functionality.

Figures 5, 6:
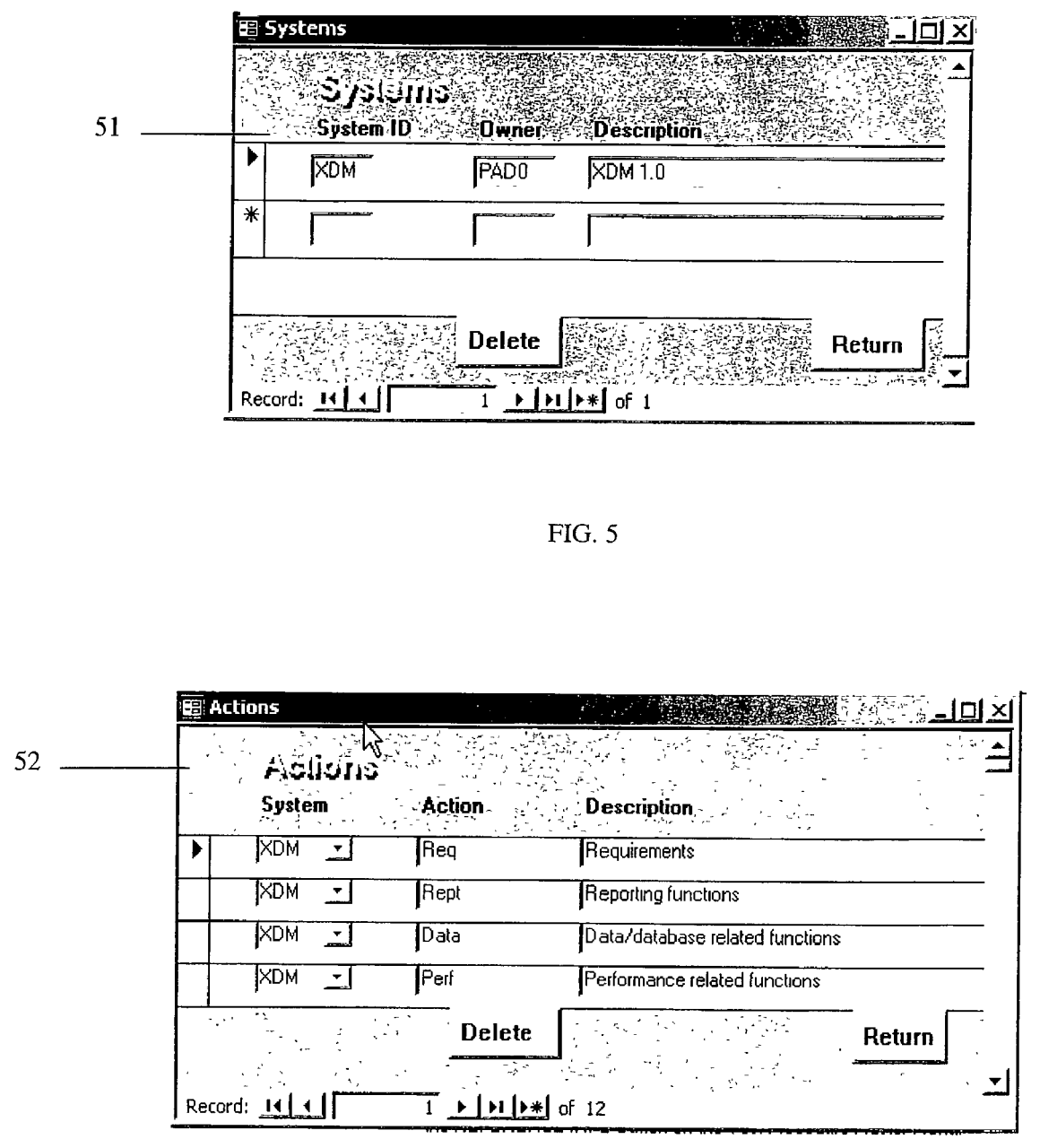

Referring now to FIG. 5 and FIG. 6, forms 51 (FIG. 5) and 52 (FIG. 6) may be used to define properties related to system 10 (FIG. 1) as a whole or actions to be undertaken. For example, forms 51 and 52 may be used to establish data values based on installation specific naming conventions which may be used to create standard names for each test procedure 25b and test requirement 25a.

Figure 7A:
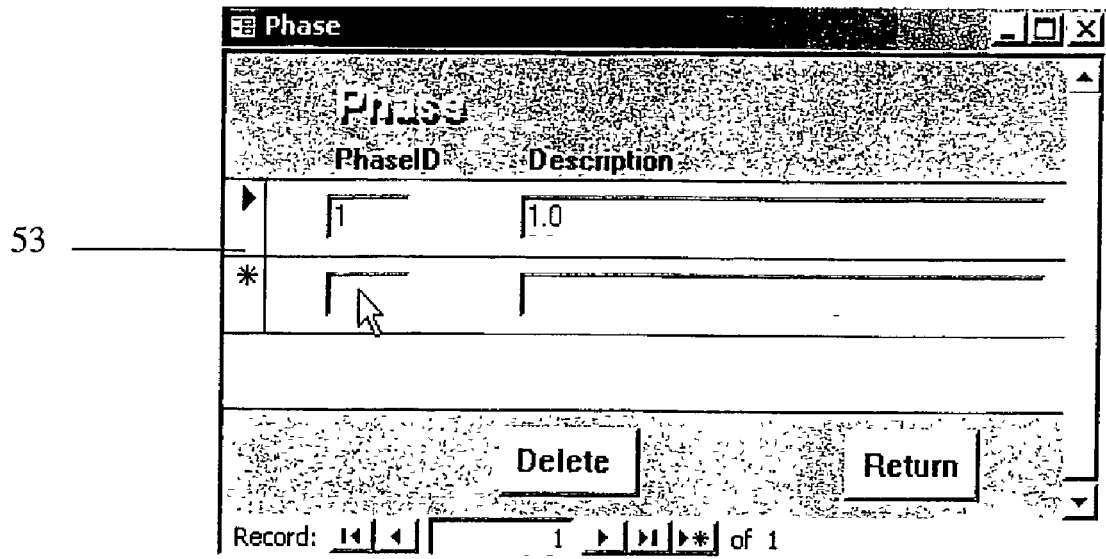
FIGS. 7a and 7b are exemplary user interface forms to configure aspects of the test system.

As illustrated in FIG. 7a, one or more testing phases may be customized using form 53, allowing a user to define various phases of testing to be performed that may be associated with one or more test procedures 25b (FIG. 1). As further illustrated in FIG. 7b, form 54 may be used to allow a user to define one or more objects that may be later associated with test procedures 25b.

Figure 7B:
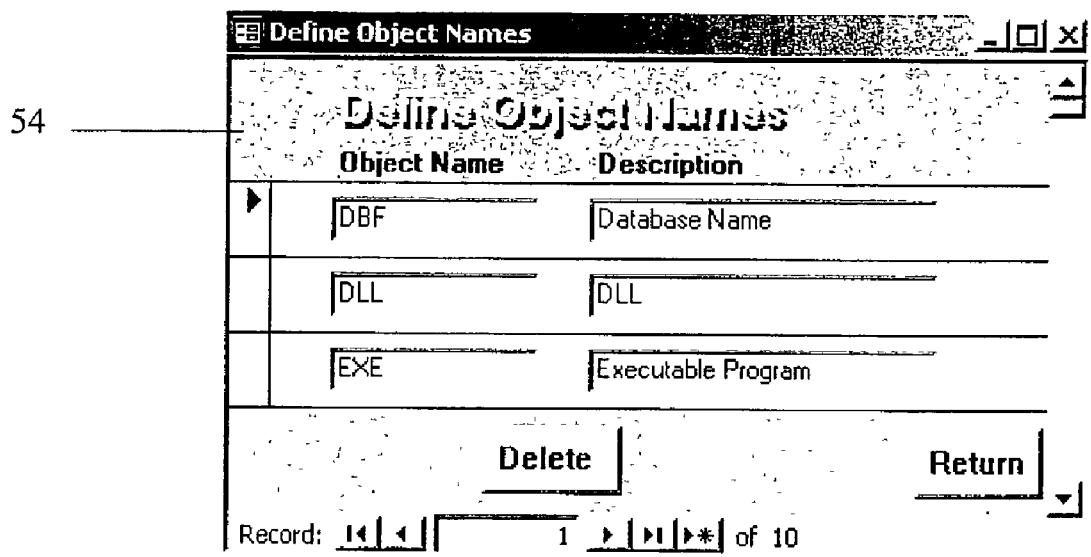
Figures 8, 9A:
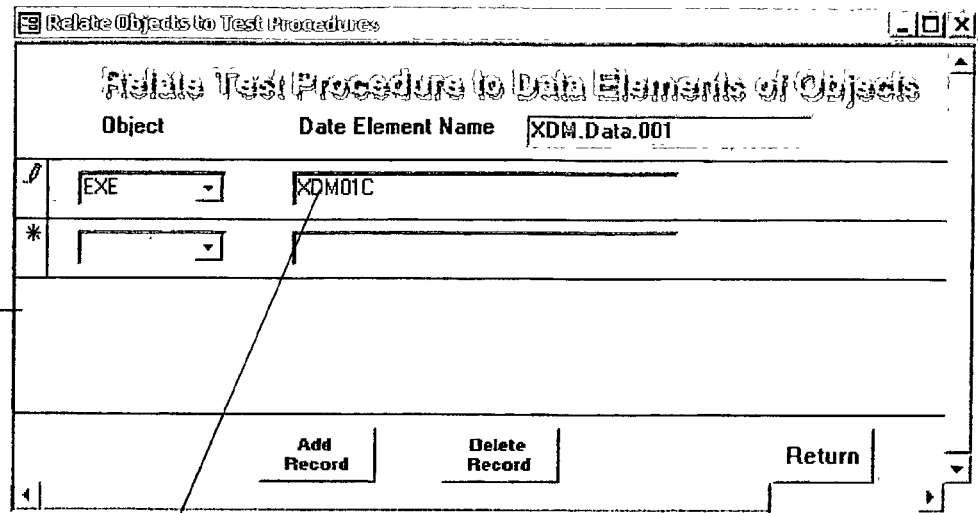
FIG. 8 is an exemplary user interface form to relate a test procedure to a data element.
FIGS. 9a and 9b are exemplary user interface forms to expand the system.

Referring now to FIG. 8, defined objects, e.g. those defined using forms 34 as illustrated in FIGS. 7b, may be used to relate a test procedure 25b (FIG. 1) being worked on to a desired object, e.g. executable module shown at 38b. This information may later be viewed in a report, enabling users who make changes to a desired module such as at 38b to identify and execute test procedures related to that module 38b.

Figure 9B:
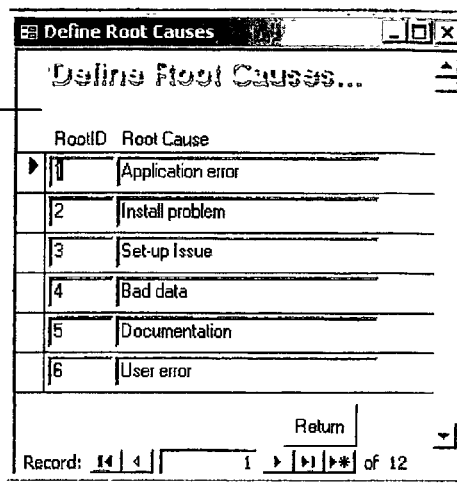

Customize button 50f and region 34g of form 34 (FIG. 4) may be used to provide access to tables 21 (FIG. 1) used by system 10 (FIG. 1). Additionally, customize button 50f and region 34g of form 34 may be used to allow a user to dynamically change characteristics of a desired table 21, e.g. to tailor those characteristics to an individual user's need. For example, as new tables 21 are added, access to new forms 34 (FIG. 1) that provide a user interface to the new tables 21 may be provided such as in a list box at region 34g (FIG. 4). For example, users of system 10 may be defined such as illustrated at FIG. 9a and explanatory codes for testing results defined such as illustrated at FIG. 9b.

Control of automated test script generation including access to test script generation options may be accessed such as illustrated at FIG. 10. Form 58 may be used to allow a user to customize the manner in which test script shells are generated. For example, the checkbox entitled "Generate timing and memory usage statistics" on form 58, when checked, will cause the application to insert code into generated test scripts to record timing and memory usage data.

It will be understood that various changes in the details, materials, and arrangements of the parts which have been described and illustrated above in order to explain the nature of this invention may be made by those skilled in the art without departing from the principle and scope of the invention as recited in the following claims.

We claim:

1. A software test method for managing user adaptable test procedures and resulting test data, comprising the steps of:
   a. storing a first test procedure for use in user assisted testing of a set of functions of an executable application;
   b. allowing a user to customize a predetermined set of system characteristics relating to the stored first test procedure;
   c. acquiring task data identifying task steps performed by the first test procedure and the user in the user assisted testing of the set of functions of the executable application;
   d. generating an executable second test procedure corresponding to the first test procedure for automatically exercising the set of functions of the executable application without user assistance; and
   e. acquiring result data derived from exercising the executable application by executing at least one of (i) the first test procedure or (ii) the second test procedure.

2. A method according to claim 1, wherein:
   a. the predetermined set of system characteristics relating to the stored test procedure comprises at least one of (i) manipulating a field, (ii) manipulating a table, (iii) manipulating a report, and (iv) manipulating a user interface.

3. A method according to claim 2, wherein:
   a. manipulating a field comprises at least one of (i) adding a field, (ii), deleting a field, and (iii) modifying a field attribute.

4. A method according to claim 2. wherein:
   a. the user interface comprises at least one of (i) an appearance of a graphical interface, (ii) content of the graphical interface, (iii) an appearance of a menu, and (iv) content of the menu.

5. A method according to claim 1, wherein:
   a. the step of acquiring task data includes:
   i. observing and collating user initiated keyboard key strokes; and
   ii. analyzing a detailed functional specification.

6. A method according to claim 1. wherein:
   a. the step of acquiring task data includes the step of acquiring at least one of (i) test related timing data, (ii) memory usage related data, and (iii) command sequence data.

7. An executable application test method for managing test procedures and resulting test data, comprising the steps of:
   a. storing a first test procedure for use in testing of a set of functions of an executable application;
   b. associating the first test procedure with document information describing a test requirement of the executable application;
   c. allowing a user to customize a predetermined set of system characteristics relating to the stored test procedure;
   d. generating linking information associating the first test procedure with individual elements of the executable application exercised by the first test procedure;
   e. initiating execution of the first test procedure;
   f. acquiring result data derived by execution of the first test procedure; and
   g. recording test outcome related information based on the acquired result data.

8. A method according to claim 7, including the further step of:
   a. providing user customizable report information, based on the recording test outcome related information and indicating whether individual requirements of the test requirements were met.

9. A method according to claim 8, including the further step of:
   a. associating a function of the executable application to be exercised with a corresponding individual test procedure.

10. A method according to claim 8, wherein:
    a. the report information supports certification by a standards associated organization including at least one of ((i) International Standards Organization (ISO), (ii) Capability Maturity Model (CMM), (iii) the United States of America Food and Drug Administration (FDA), and (iv) American National Standards Institute (ANSO).

11. A method according to claim 7, including the further step of:
    a. collating and storing test failure data and associated test step timing information.

12. A method according to claim 7, including the further step of:
    a. acquiring task data identifying task steps performed by the first test procedure in testing of the set of functions of the executable application.

13. A method according to claim 7, wherein:
    a. the individual elements of the executable application comprise at least one of (i) an executable procedure used by the executable application, (ii) a function implemented by the executable application, (iii) a user interface form used by the executable application, and (iv) a software object employed by the executable application.

14. A method of creating and maintaining a test procedure for a software system, comprising the activities of: in response to user command,
    a. initializing a software test tool;
    b. receiving software test tool requirement representative data including receiving user entered data representing a requirement derived from at least one of (i) an internal testing policy for a test requirement to be satisfied by the software test tool, (ii) an internal testing procedure for a test requirement to be satisfied by the software test tool, and (iii) an internal testing procedure for a test metric requirement needed to substantiate a testing effort of the software test tool;
    c. modifying a predetermined set of elements of the software test tool based on the software test tool requirement representative data;
    d. modifying the software test tool to allow for at least one of (i) importation of data from an external software application and (ii) exportation of data to an external software application; and
    e. modifying the software test tool to allow for meeting certification standards.

15. The method of creating and maintaining a test procedure for a software system of claim 14, wherein:
    a. receiving software test tool requirement representative data includes receiving data representative of external testing standardization organization requirements.

16. The method of creating and maintaining a test procedure for a software system of claim 14, wherein:
    a. the test tool elements comprise at least one of (i) a manipulatable field, (ii) a manipulatable table, (iii) a manipulatable report, and (iv) a manipulatable user interface.

17. The method of creating and maintaining a test procedure for a software system of claim 14, wherein:
    a. the certification standards comprise a standard from at least one of (i) International Standards Organization (ISO). (ii) Capability Maturity Model (CMM), (iii) the United States Food and Drug Administration (FDA), and (iv) American National Standards Institute (ANSI).

* * * * *